United States Patent
Kim et al.

(10) Patent No.: US 12,425,510 B2
(45) Date of Patent: Sep. 23, 2025

(54) MOBILE TERMINAL

(71) Applicant: LG ELECTRONICS INC., Seoul (KR)

(72) Inventors: Changmok Kim, Seoul (KR); Jinhee Lee, Seoul (KR); Eunkyung Choi, Seoul (KR); Junho Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 728 days.

(21) Appl. No.: 17/778,815

(22) PCT Filed: Nov. 22, 2019

(86) PCT No.: PCT/KR2019/016151
§ 371 (c)(1),
(2) Date: May 20, 2022

(87) PCT Pub. No.: WO2021/100941
PCT Pub. Date: May 27, 2021

(65) Prior Publication Data
US 2022/0407955 A1    Dec. 22, 2022

(51) Int. Cl.
*H04M 1/72*    (2021.01)
*H04M 1/02*    (2006.01)
(Continued)

(52) U.S. Cl.
CPC ..... *H04M 1/72454* (2021.01); *H04M 1/0237* (2013.01); *H04M 1/0268* (2013.01);
(Continued)

(58) Field of Classification Search
CPC .... G06F 1/1624; G06F 1/1652; G06F 1/1677; G06F 2203/04803; G06F 3/0482;
(Continued)

(56) References Cited

U.S. PATENT DOCUMENTS

2016/0275774 A1    9/2016  Bostick et al.
2017/0061932 A1*   3/2017  Kwon ................... G06F 1/1626
(Continued)

FOREIGN PATENT DOCUMENTS

EP    3136223    3/2017
EP    3258675    12/2017
(Continued)

OTHER PUBLICATIONS

PCT International Application No. PCT/KR2019/016151, Written Opinion and International Search Report dated Aug. 21, 2020, 18 pages.

(Continued)

*Primary Examiner* — Nader Bolourchi
(74) *Attorney, Agent, or Firm* — LEE, HONG, DEGERMAN, KANG & WAIMEY

(57) ABSTRACT

The objective of the present invention is to provide a mobile terminal in which a layout of execution screens of two or more applications displayed together can be automatically changed to be suited for a user's viewing. According to an aspect of the present invention, provided is a mobile terminal comprising: a body; a display coupled to the body such that a display area viewed from the front of the body can be changed according to the switching between an extension display mode and a contraction display mode; and a control unit for controlling such that a layout for two or more application execution screens displayed together on the display is changed in response to the switching from the extension display mode to the contraction display mode.

11 Claims, 17 Drawing Sheets

(51) Int. Cl.
    *H04M 1/72454*    (2021.01)
    *H04M 1/72469*    (2021.01)

(52) U.S. Cl.
    CPC .... *H04M 1/72469* (2021.01); *H04M 2201/38* (2013.01); *H04M 2201/42* (2013.01)

(58) Field of Classification Search
    CPC .......................... G06F 3/0488; G06F 3/04886; H04M 1/0237; H04M 1/0241; H04M 1/0268; H04M 1/72454; H04M 1/72469; H04M 2201/38; H04M 2201/42
    See application file for complete search history.

(56) References Cited

U.S. PATENT DOCUMENTS

2017/0103735 A1    4/2017    Oh et al.

2017/0364119 A1*    12/2017    Lee ........................ G06F 1/1652
2019/0187758 A1*    6/2019    Lee ........................ G06F 1/1677
2019/0261519 A1*    8/2019    Park ....................... G06F 1/1677

FOREIGN PATENT DOCUMENTS

| EP | 3441844 | 2/2019 |
| EP | 3531230 | 8/2019 |
| KR | 1020150012233 | 2/2015 |
| KR | 1020160139643 | 12/2016 |
| KR | 1020170083404 | 7/2017 |
| KR | 1020190101184 | 8/2019 |

OTHER PUBLICATIONS

European Patent Office Application Serial No. 19953157.5, Search Report dated Jun. 26, 2023, 10 pages.

* cited by examiner

FIG. 3
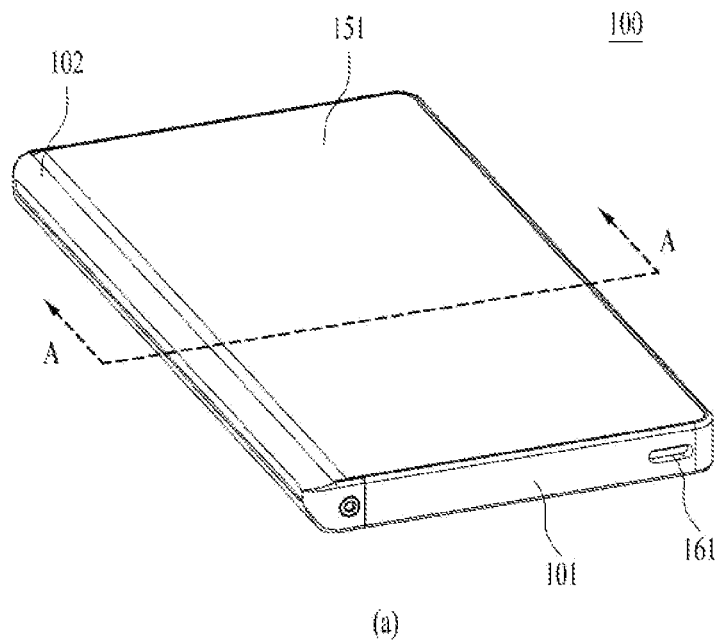
(a)
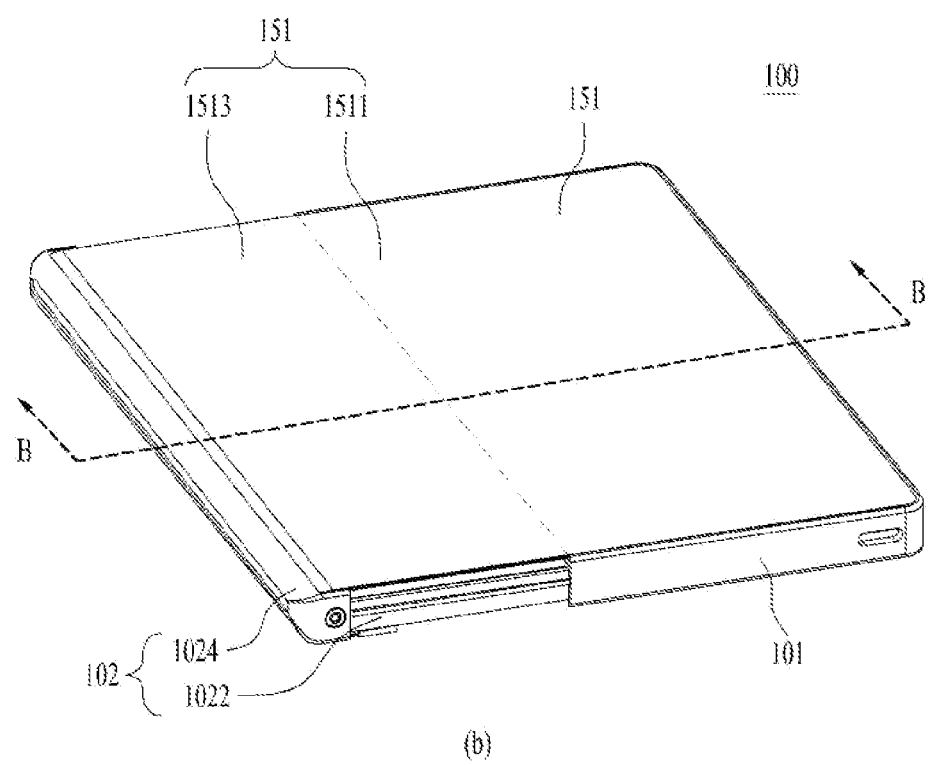
(b)

FIG. 4
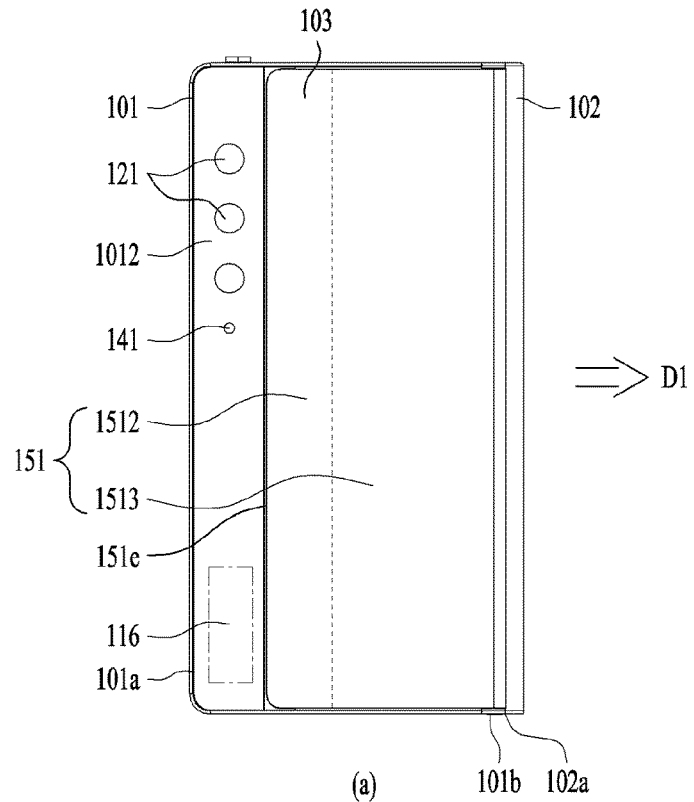
(a)
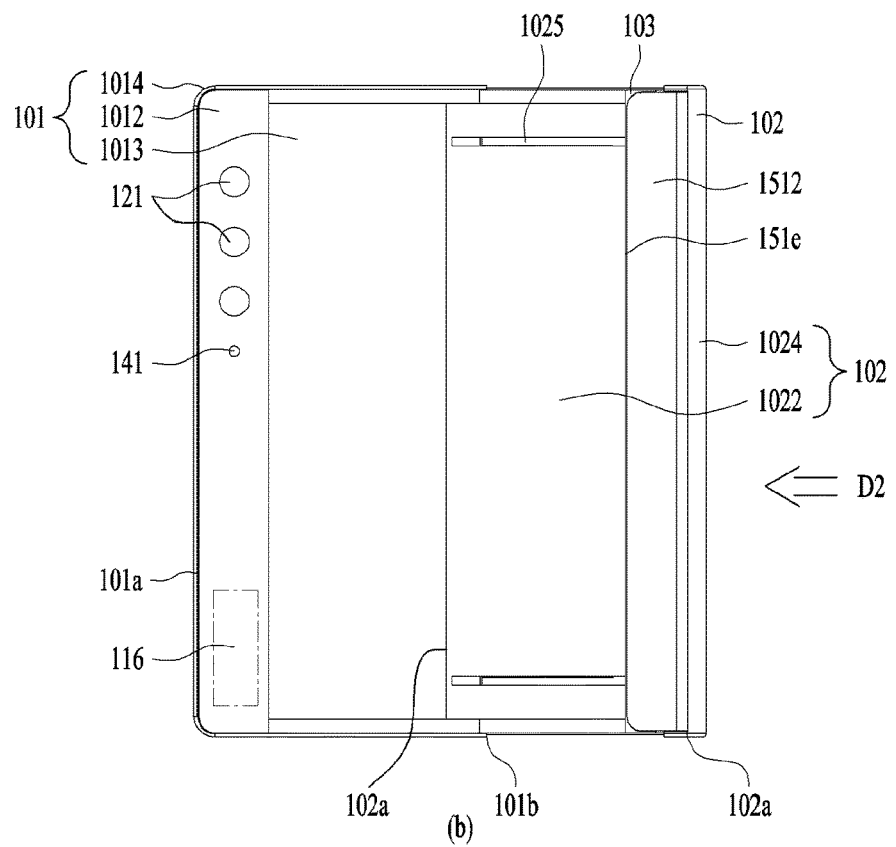
(b)

(a)  (b)

MOBILE TERMINAL

CROSS-REFERENCE TO RELATED APPLICATIONS

This application is the National Stage filing under 35 U.S.C. 371 of International Application No. PCT/KR2019/016151, filed on Nov. 22, 2019, the contents of which are all incorporated by reference herein in their entirety.

TECHNICAL FIELD

The present disclosure relates to a mobile terminal, and relates to a mobile terminal having a flexible display whose size is able to be changed and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

Recently, a flexible display that can be greatly deformed with sufficient elasticity has been developed. The display of the mobile terminal can be changed in size due to the deformability of the flexible display.

On the other hand, recent mobile terminals can perform multitasking in which two or more applications can be simultaneously executed. As multitasking is executed, execution screens of two or more applications can be displayed together on the display of the mobile terminal.

DISCLOSURE

Technical Problem

An object of the present disclosure is to provide a mobile terminal in which a layout of execution screens of two or more applications displayed together can be automatically changed to be suitable for the user's viewing as the display size of the mobile terminal is changed.

Technical Solutions

In accordance with one aspect of the present disclosure, a mobile terminal includes a body, a display coupled to the body such that a display region visible on a front surface of the body is changeable as a display mode is switched between the extended display mode and the contracted display mode, and a controller configured to control a layout for two or more application execution screens simultaneously displayed on the display to be changed in response to switching from the extended display mode to the contracted display mode.

The body may include a first frame, and a second frame extending from the first frame and coupled to the first frame so as to be contractible to the first frame. The display may include a flexible display capable of surrounding a front surface, a side surface, and a back surface of the body. The controller may operate in the extended display mode as the second frame is extended, and may operate in the contracted display mode as the second frame is contracted.

In accordance with another aspect of the present disclosure, a mobile terminal may include a display, and a controller. The controller may control two or more application execution screens to be displayed together according to a first layout. In response to a first user command, the controller may control at least one execution screen from among the two or more application execution screens not to be displayed. In response to a second user command, the controller may control the two or more application execution screens to be re-displayed according to a first layout.

Advantageous Effects

The effects of the mobile terminal according to the present disclosure will now be described.

According to at least one of the embodiments of the present disclosure, as the mobile terminal switches from the extended display mode to the contracted display mode, the layout of two or more application execution screens displayed together on the display of the mobile terminal can be automatically changed to be suitable for the user's viewing.

According to at least one of the embodiments of the present disclosure, in the contracted display mode of the mobile terminal, the user who uses the mobile terminal can quickly and conveniently select a desired application execution screen from among the two or more application execution screens.

In addition, according to at least one of the embodiments of the present disclosure, in the extended display mode of the mobile terminal, the layout of the two or more application execution screens can be changed to be suitable for the user's viewing.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 3 shows perspective views respectively illustrating a first state and a second state viewed from one side of a mobile terminal according to one embodiment.

FIG. 4 shows rear face views respectively illustrating a first state and a second state of a mobile terminal according to one embodiment.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
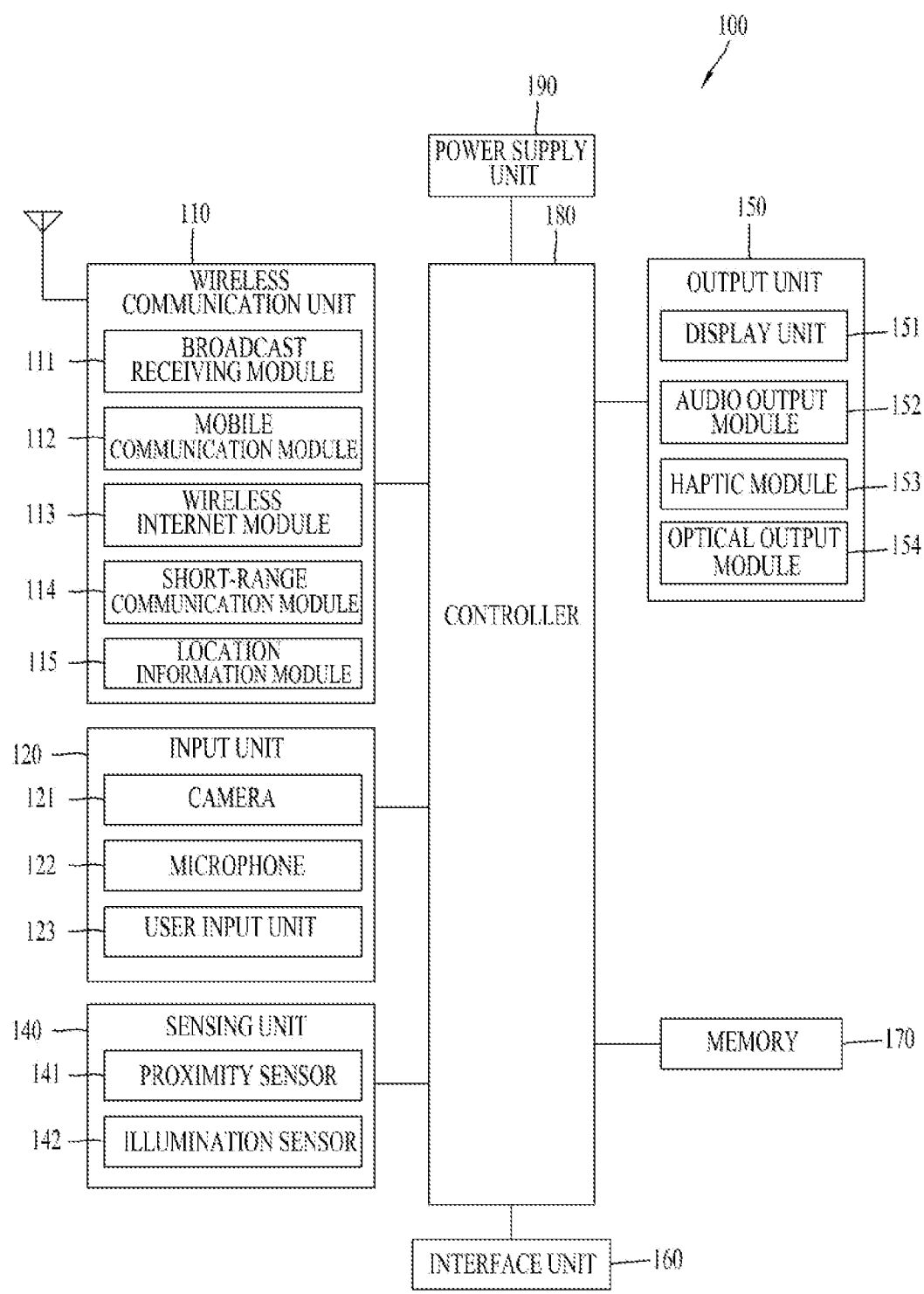
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
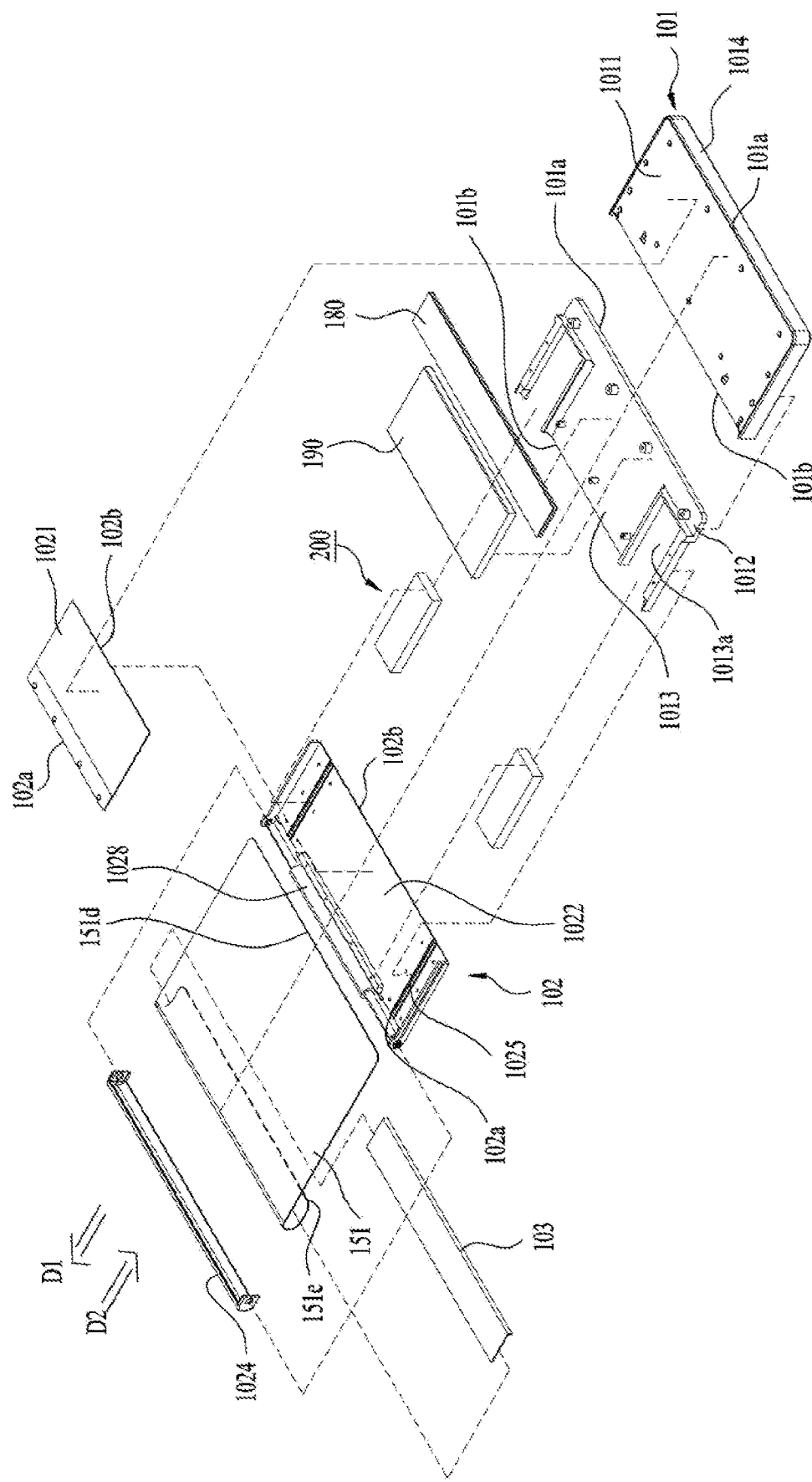
FIG. 2 is an exploded perspective view of a mobile terminal according to one embodiment.
Figure 5:
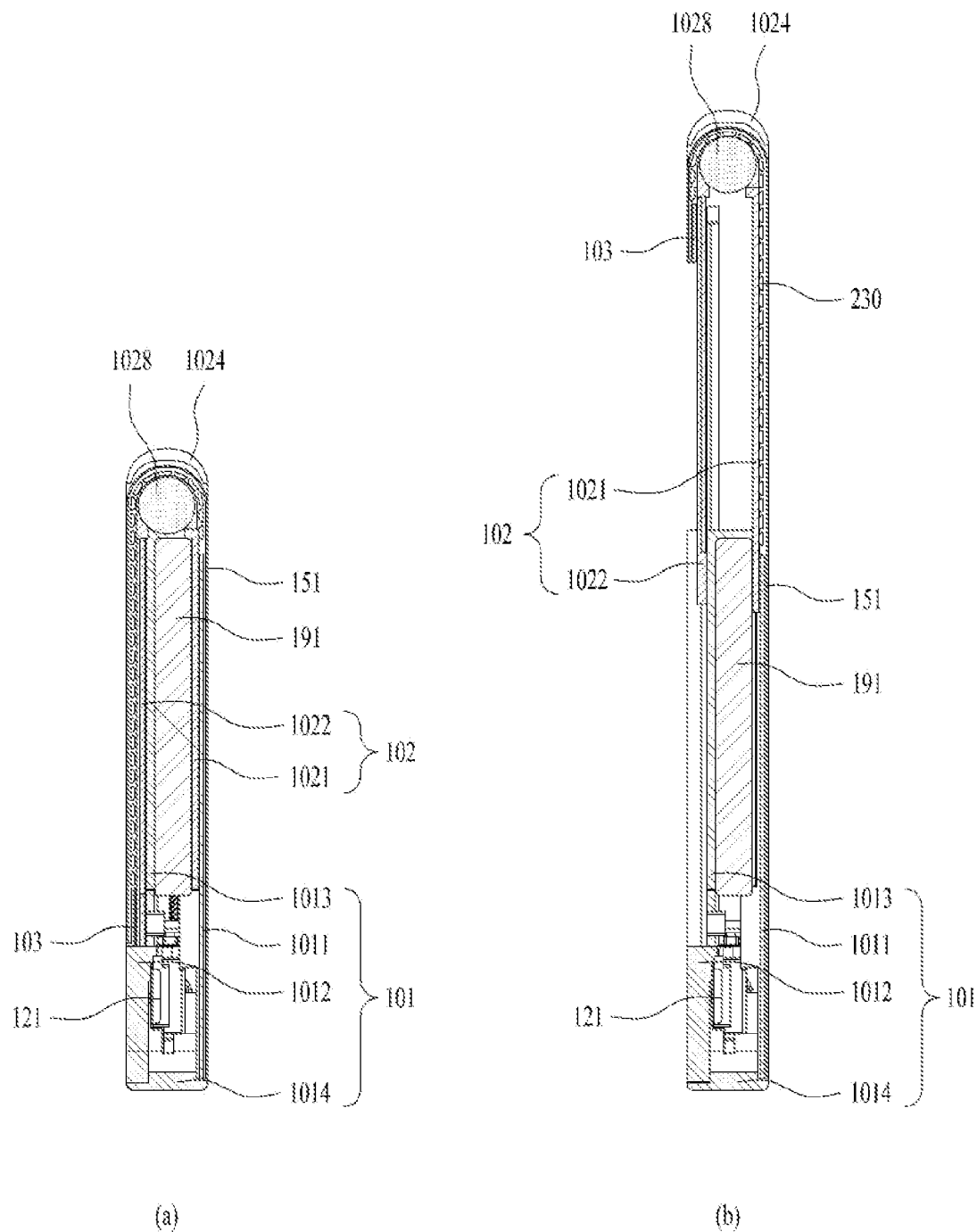
FIG. 5 shows cross-sectional views respectively taken along a line A-A and a line B-B of FIG. 3.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3(*a*), 4(*a*), and 5(*a*) show a first state of the mobile terminal, and FIGS. 3(*b*), 4(*b*), and 5(*b*) show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, the size of the mobile terminal 100 and a size of a front face of the display unit 151 are larger than those in the first state. In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

The mobile terminal 100 of the present disclosure may be converted from the first state in which the display unit 151 is positioned on the front face of a bar-shaped mobile terminal as shown in FIG. 3(*a*) into the second state as shown in FIG. 3(*b*) by enlarging a screen thereof. In the second state, an area of the front face of the display unit 151 is enlarged, and an area of a rear face of the display unit 151 is reduced as shown in FIG. 4(b). That is, the display unit 151 positioned on a rear face of the mobile terminal 151 in the first state moves to the front face of the mobile terminal 100 in the second state.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to third frames 101 to 103 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, e.g., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on one of both sides of the mobile terminal 100. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and a first rear portion 1012 and a second rear portion 1013 disposed at a rear portion of the mobile terminal.

Such first front portion 1011, first rear portion 1012, and second rear portion 1013 may be respectively formed of plate-shaped members that are generally flat. The first rear portion 1012 and the second rear portion 1013 may be respectively formed of separate members coupled to each other or may be formed of one member as shown. The first front portion 1011 and the first rear portion/second rear portion 1012 and 1013 may be spaced apart from each other at a predetermined spacing to define a predetermined space therebetween, and may be connected to each other by a side portion 1014. The controller 180 and the power supply unit 190 may be accommodated as components of the mobile terminal 100 in the space in the first frame 101. For example, the controller 180 may be a circuit board including a processor and an electronic circuit for controlling the operation of the mobile terminal, and the power supply unit 190 may be a battery and related components. In addition, the second frame 102 and the driving unit 200 to described later may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

In one example, as shown in FIG. 4, various physical input units 120 for manipulation of the mobile terminal 100 and sensing units 140 may be located on the first rear portion 1012, and the display unit 151 may be disposed only on the second rear portion 1013. Since the first rear portion 1012 does not overlap the flexible display unit 151 regardless of the state of the mobile terminal, and is always exposed to the outside, the input unit 120 such as various buttons, switches, the camera 121, and a flash, and the sensing unit 140 such as a proximity sensor 141 may be arranged on the first rear portion 1012. In a conventional bar-shaped terminal, a display unit is provided only on a front face of the terminal. Therefore, a main camera is placed on a rear face of the terminal in order for the user to capture an object at an opposite side while looking through the display unit 151. On the other hand, an additional auxiliary camera is required to be disposed on the front face of the terminal in order for the user to capture himself or herself while viewing himself or herself through the display unit 151.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor sound output unit may be positioned on the first rear portion 1012, and an antenna 116 may be installed on the first rear portion 1012.

The side portion 1014 may extend along edges of the first front portion 1011 and the first rear portion/second rear portion 1012 and 1013 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the same side portion, and thus, the portion of the first frame 101 may be opened. Accordingly, the first frame 101 may include a substantially closed first side portion 101a and a second side portion 101b, which is disposed to be opposite to the first side portion 101a and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second rear portion 1013 of the first frame 101 may be covered by the display unit 151, but may be disposed on the front face of the display unit 151 using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1023 may be formed of plate-shaped members that are generally flat. In addition, the second frame 102 also accommodates various components, and should not interfere with the components accommodated in the first frame 101 during the movement. Accordingly, the second front portion 1021 and the third rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension should be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display unit 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (e.g., the first direction D1 or the second direction D2) relative to the second frame 102. The roller 1028 may guide such movement while rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon. That is, the side frame 1024 covers the side face of the display unit 151, and the side face thereof is located in the third region. The first to third regions are at specified positions on the flexible display unit and do not change in size or position, but the sizes of the front face and the rear face, and the position of the side face are determined based on the state of the main frame.

Because the side face is rolled by the roller, the side face is bent with the predetermined curvature, and an inner face of the side frame may include a curved face corresponding to the curvature of the side face.

The first region and the second region correspond to the fixed portion described above. The third region corresponds to the variable portion described above, and may vary in position depending on the state of the mobile terminal. Because of the side frame 1024, the second frame 102 may have the substantially closed first side portion 102a, and the side frame 1024 may substantially form the outer shape of the mobile terminal 100 together with the side face 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (e.g., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 should move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may is be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151d toward the second side edge 151e by a predetermined length, and a second region 1512 disposed opposite the first region 1511, and extending from the second side edge 151e toward the first side edge 151d by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. The first region and the second region corresponds to the fixed portion described above, and the third region corresponds to the variable portion described above Such configuration of the display unit 151 will be described in more detail below. The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 4(b), the slot 1025 extending in the lateral direction (e.g, the direction perpendicular to the longitudinal direction of the mobile terminal 100) to the second frame 102, that is, to the third rear portion 1022 is defined. Further, the third frame 103 may move along the slot 1025. In FIG. 4(b), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 4 (b), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

Hereinafter, an embodiment in which two or more application execution screens are displayed together on the display of the mobile terminal as described above will be described with reference to FIGS. 6 to 17.

Hereinafter, the term "extended (or enlarged) display mode" may refer to a mode in which the mobile terminal displays a lock screen, a home screen, or content (e.g., an application execution screen) while a second frame is extended from the first frame.

Hereinafter, the term "contracted (or retracted) display mode" may refer to a mode in which the mobile terminal displays a lock screen, a home screen, or content (e.g., an application execution screen) while the second frame is contracted toward the first frame.

Hereinafter, the term "front display region" for use in the extended display mode may refer to a region composed of a first region 1511 and a third region 1513 when the mobile terminal is in the extended display mode.

Hereinafter, the term "front display region" for use in the contracted display mode may refer to a region composed of the first region 1511 when the mobile terminal is in the contracted display mode.

That is, the front display region for use in the extended display mode may be larger in width than the front display region in the contracted display mode.

Hereinafter, the term "rear display region" for use in the extended display mode may refer to a region composed of the second region 1512 when the mobile terminal is in the extended display mode.

Hereinafter, the term "rear display region" for use in the contracted display mode may refer to a region composed of a second region 1512 and a third region 1513 when the mobile terminal is in the contracted display mode.

That is, the rear display region for use in the extended display mode may be smaller in width than the rear display region for use in the contracted display mode.

The embodiment in which two or more application execution screens are displayed together according to the extended display mode and the contracted display mode described below does not have to be applied only to the mobile terminal in which the first frame and the second frame are combined as described above with reference to FIGS. 2 to 5. For example, if the display region is changeable in size, such as a foldable form factor, a sliding form factor, a rollable form factor, etc., the embodiment of the present disclosure can also be applied to any type of mobile terminal.

Figure 6:
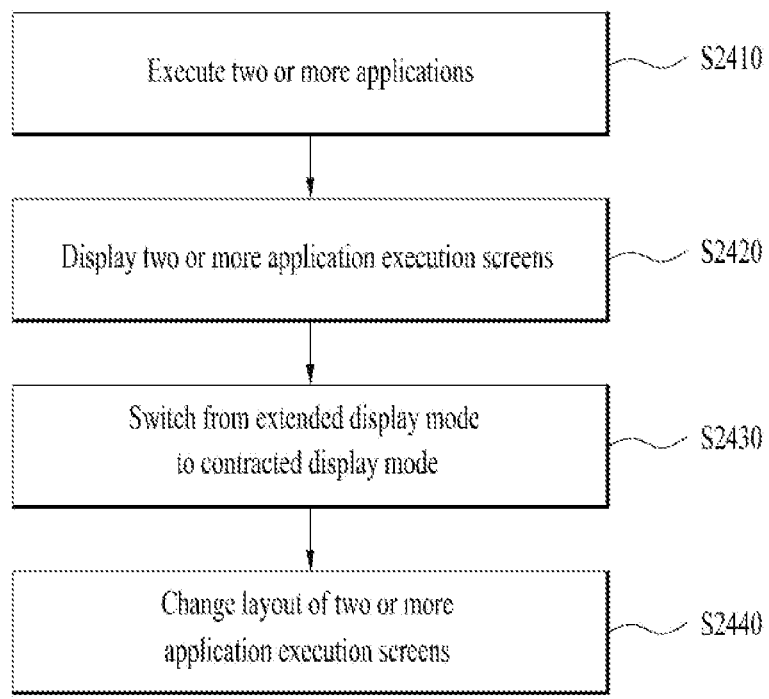
FIG. 6 is a flowchart illustrating a method for changing a layout of two or more application execution screens displayed on a display of a mobile terminal according to an embodiment of the present disclosure.

Hereinafter, a layout change of two or more application execution screens displayed on the display of the mobile terminal according to the embodiments of the present disclosure will be described with reference to FIG. 6. FIG. 6 is a flowchart illustrating a method for changing the layout of two or more application execution screens displayed on the display of the mobile terminal according to an embodiment of the present disclosure.

The mobile terminal 100 can simultaneously execute two or more applications (S2410). That is, the mobile terminal 100 may execute the two or more applications through multitasking. Here, the term "simultaneous" in step S2410 indicates that the two or more applications of the mobile terminal need not always be started at the same time, and indicates that there is a need for the two or more applications to be executed together in the mobile terminal at any arbitrary time point.

When the mobile terminal 100 is in the extended display mode, the controller 100 may simultaneously display the execution screens of the two or more applications on the front display region (S2420). Here, the term "simultaneous" in step S2420 is the same meaning as described above, and indicates that the two or more application execution screens are displayed together at any arbitrary time point.

While the execution screens of the two or more applications are displayed on the front display region at the same time, the mobile terminal 100 can switch from the extended display mode to the contracted display mode (S2430). Switching from the extended display mode to the contracted display mode may be performed according to a user's manual operation (e.g., a touch input) of the mobile terminal. Alternatively, when a preset event (e.g., call reception, message reception, etc.) irrelevant to the above manual operation occurs in the mobile terminal, such switching from the extended display mode to the contracted display mode may also be performed.

As a result, the controller 180 may change the layout of the two or more application execution screens. That is, even if the user does not input a separate user command for changing the layout, the layout can be changed when the extended display mode is switched to the contracted display mode.

Here, the layout change may include changing at least one of a mutual location and an individual size of the two or more application execution screens, and preventing at least one of the two or more application execution screens from being displayed.

Figure 7:
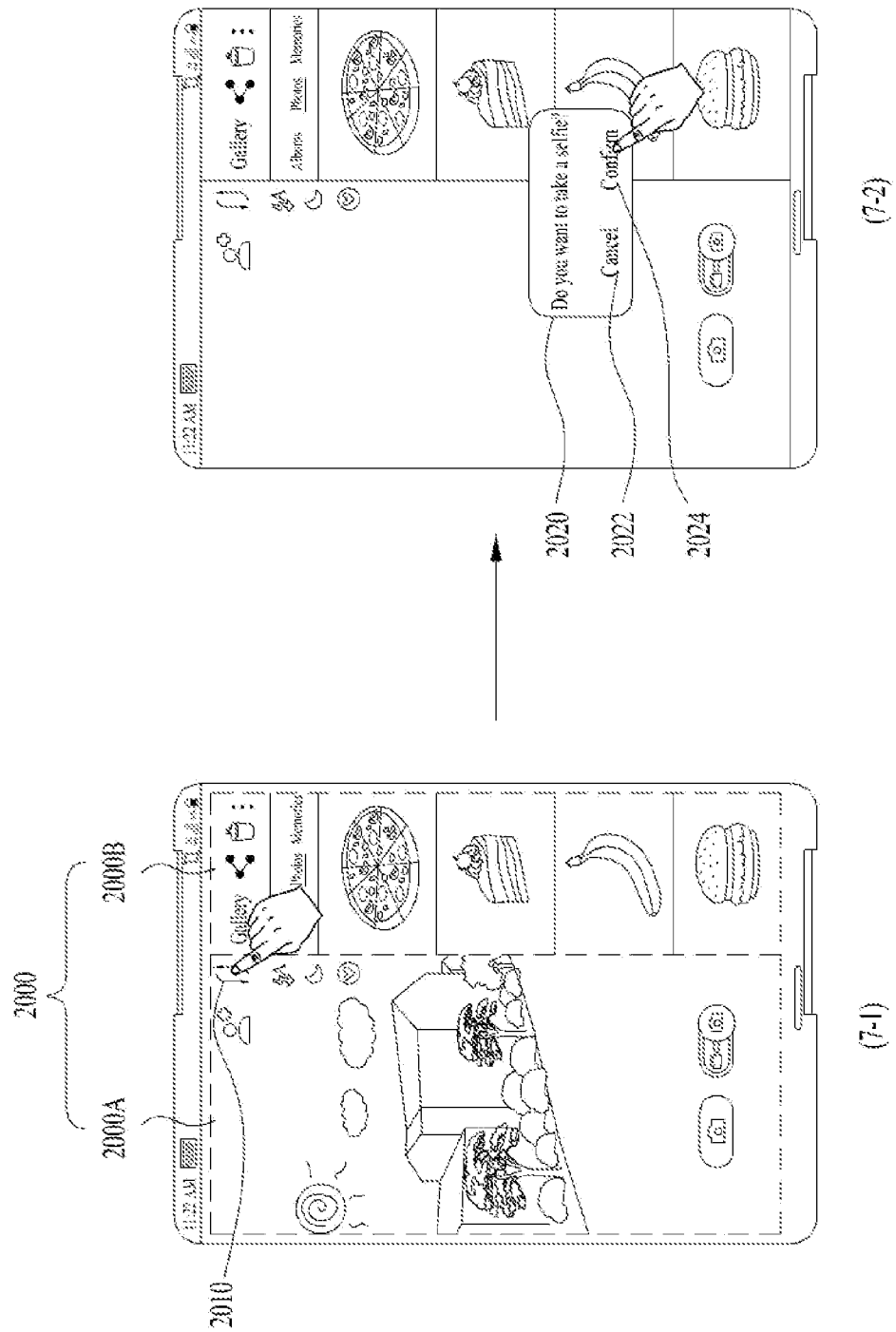
FIG. 7 is a view illustrating examples of a front display area for use in an extended display mode according to an embodiment of the present disclosure.
Figure 8:
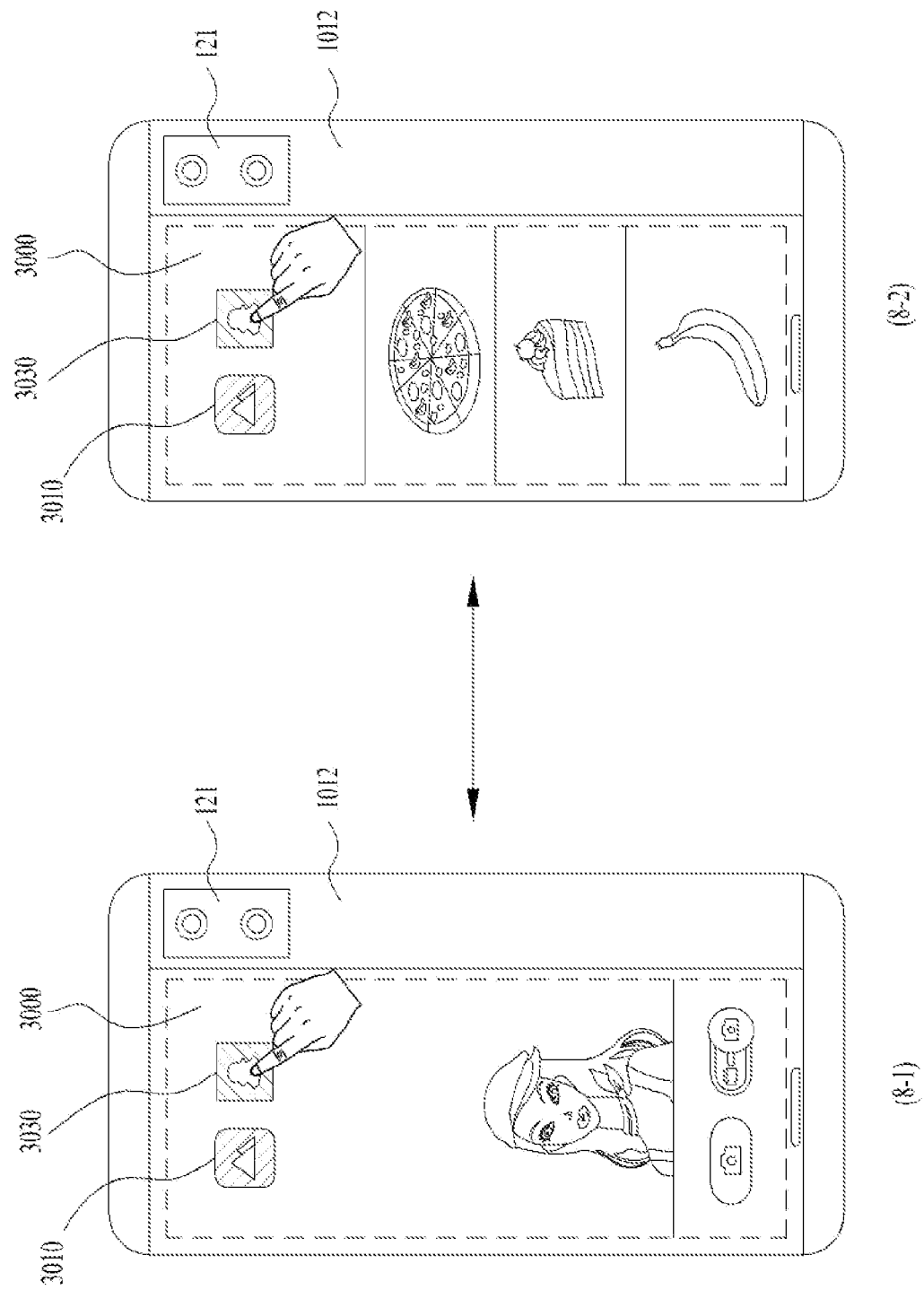
FIG. 8 is a view illustrating examples of a rear display area for use in a contracted display mode according to an embodiment of the present disclosure.
Figure 9:
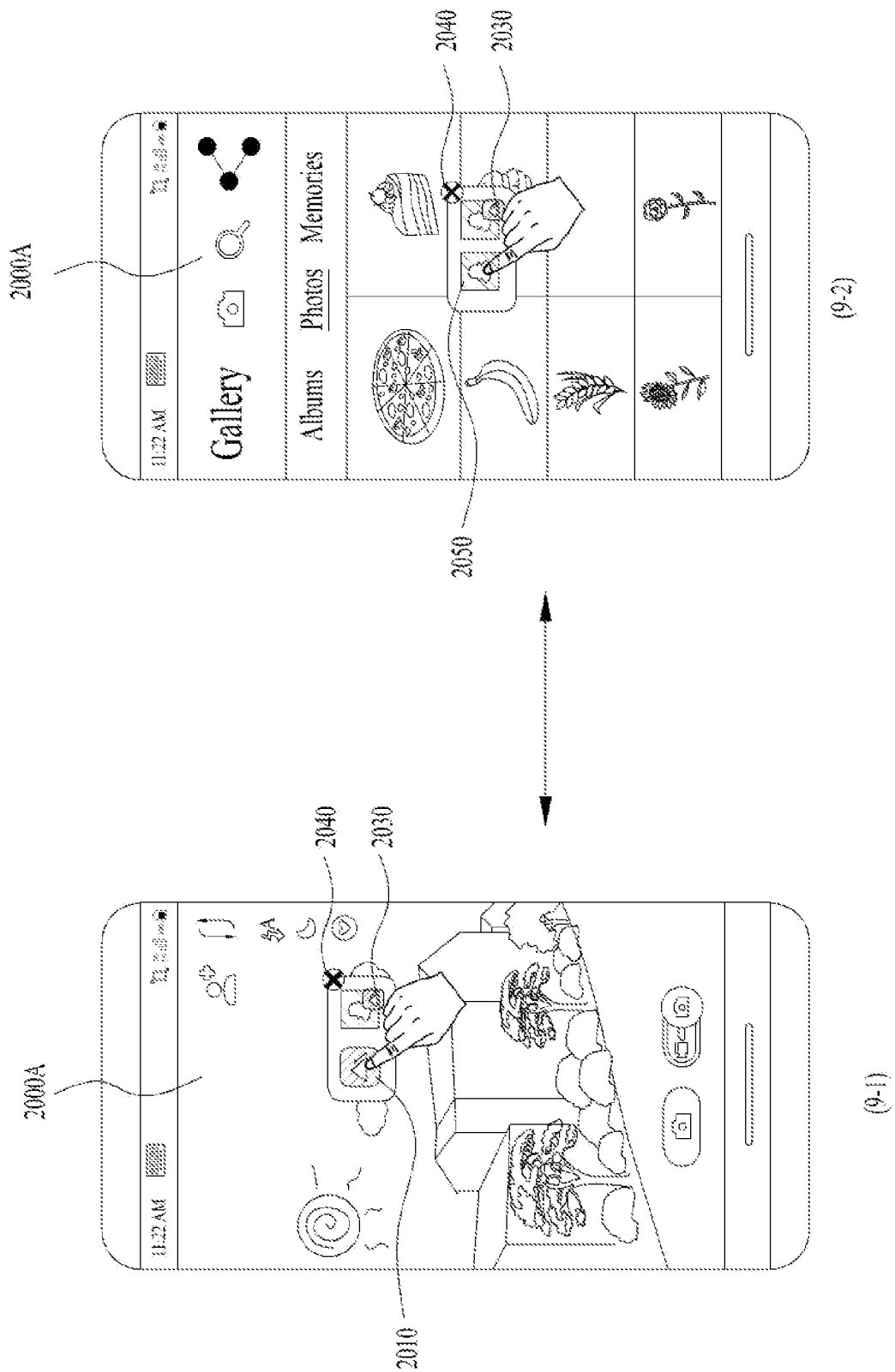
FIG. 9 is a view illustrating examples of a front display area for use in a contracted display mode according to an embodiment of the present disclosure.
Figure 10:
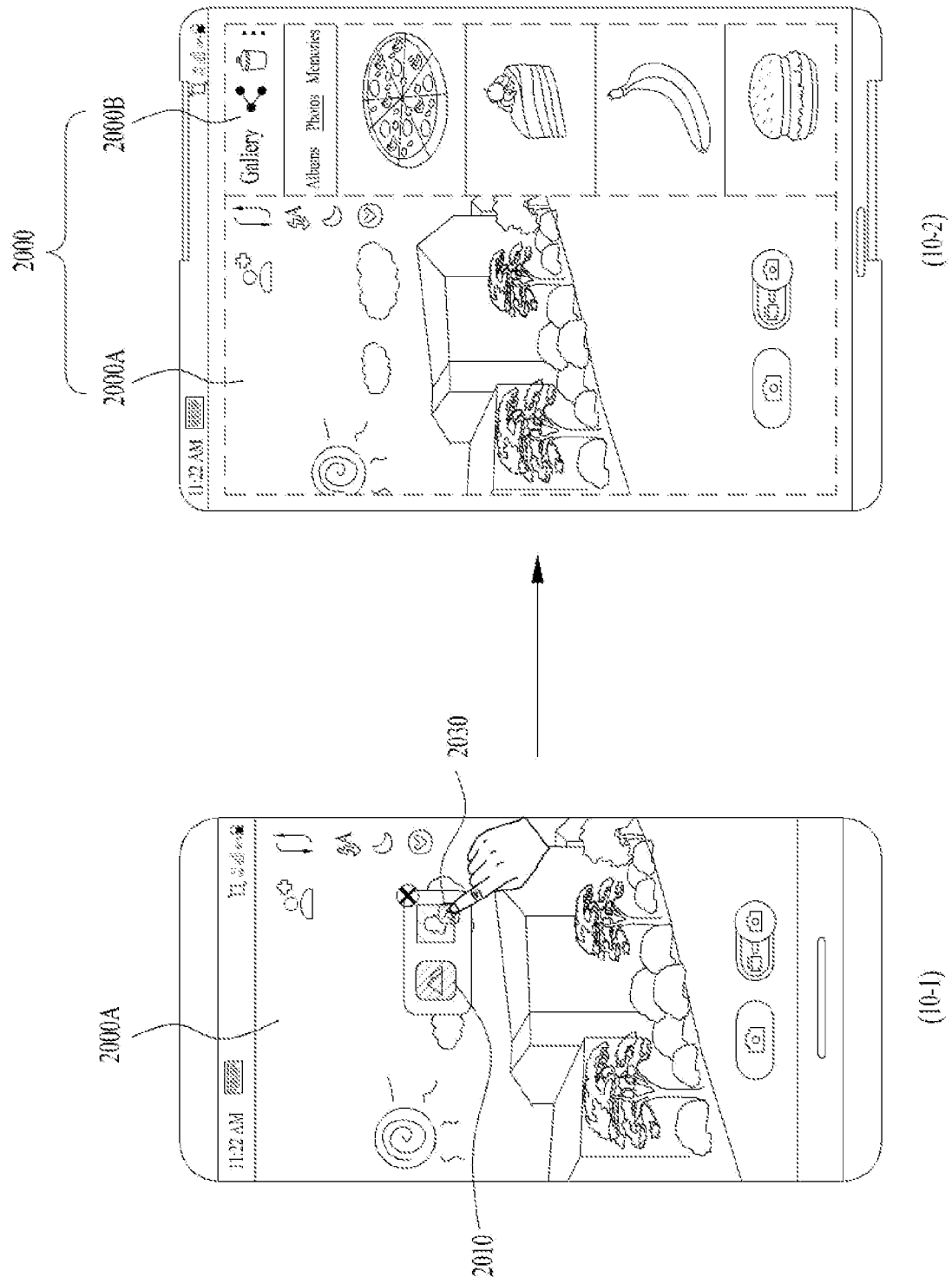
FIG. 10 illustrates a front display region for use in the contracted display mode and a front display region for use in the extended display mode according to an embodiment of the present disclosure.

Hereinafter, the layout change of the two or more application execution screens will be described in detail with reference to FIGS. 7 to 10. FIG. 7 is a view illustrating examples of a front display area for use in the extended display mode according to an embodiment of the present disclosure. FIG. 8 is a view illustrating examples of a rear display area for use in the contracted display mode according to an embodiment of the present disclosure. FIG. 9 is a view illustrating examples of a front display area for use in the contracted display mode according to an embodiment of the present disclosure. FIG. 10 illustrates a front display region for use in the contracted display mode and a front display region for use in the extended display mode according to an embodiment of the present disclosure.

As described above, the mobile terminal 100 may execute two or more applications through multitasking. The two or more applications may be multitasked in the extended display mode, or may be multitasked in the contracted display mode.

For convenience of explanation, it is assumed that a camera application and a gallery application are being executed in multitasking in the mobile terminal 100. Instead of at least one of the camera application and the gallery application, another application may be executed through multitasking, or any other applications other than the above applications can also be executed as needed.

The two or more applications may be multitasked in the extended display mode. This means that multitasking of the two or more applications is started in the extended display mode, or means that, after the two or more applications are started in the contracted display mode, the contracted display mode is switched to the extended display mode.

In this case, as shown in (7-1) of FIG. 7, the controller 180 may divide the front display region 2000 according to the extended display mode into two display regions, that is, a first display region 2000A and a second display region 2000B, and may control the execution screen of the first application and the execution screen of the second application to be displayed on the first display region 2000A and the second display region 2000B, respectively. That is, the execution screen of the camera application may be displayed in the first display region 2000A, and the execution screen of the gallery application may be displayed in the second display region 2000B, so that the two execution screens can be simultaneously displayed as a horizontal layout on the front display region 2000 according to the extended display mode. However, the camera application execution screen and the gallery application execution screen may be simultaneously displayed on the front display region 2000 in different layouts. Image signals received by the camera 121 in real time may be displayed as a real-time preview image for photographing a picture or moving pictures on the camera application execution screen. In addition, various menus and shutter icons for photographing a picture may be displayed on a lower region of the camera application execution screen. A thumbnail list of pictures and/or images stored in the mobile terminal may be displayed on the gallery application execution screen.

The first display region 2000A may correspond to the first region 1511 described above, and the second display region 2000B may correspond to the third region 1513 described above. However, in the present disclosure, the first display region 2000A need not always be matched to the first region 1511, and the second display region 2000B need not always be matched to the third region 1513. The first display region 2000A and the second display region 2000B may be configured in a manner that the front display region 200 according to the extended display mode can occupy any two regions. The first display region 2000A and the second display region 2000B may also partially overlap each other.

A selfie mode icon 2010 on the camera display execution screen may be touched and selected by the user.

However, as shown in (7-2) of FIG. 7, the controller 180 may display a guide graphic 2020 for confirming switching to the selfie mode. While the guide graphic 2020 is being displayed, the controller 180 may not display the preview image on the camera application execution screen. However, the preview image may also be continuously displayed as needed.

When the cancel menu 2022 in the guide graphic 2020 is touched and selected, the mobile terminal may return to the state of (7-1) of FIG. 7.

The controller 180 may operate the driving unit 200 so that the controller 180 can switch from the extended display mode to the contracted display mode. Alternatively, the user may manually switch from the extended display mode to the contracted display mode using the user's force, after touching the confirmation menu 2024 of the guide graphic 2020.

The rear display region when the display mode is switched to the contracted display mode will be described with reference to FIG. 8.

As described above, a first rear unit 1012 may be provided with a camera 121. Therefore, as shown in (8-1) of FIG. 8, the user may take a selfie with the first rear unit 1012 of the mobile terminal 100 facing the user.

That is, as shown in (8-1) of FIG. 8, the controller 180 may control the camera application execution screen to be displayed on the rear display region 3000. The camera application execution screen may display a real-time preview image for taking a selfie and various menus and shutter icons for taking a photograph. Accordingly, the user can take a selfie while viewing the real-time preview image displayed on the rear display region 3000.

In addition, the controller 180 may display, on the rear display region 3000, icons respectively representing all applications being multitasked. That is, the gallery application icon 3010 and the camera application icon 3030 may be displayed on the rear display region 3000.

The gallery application icon 3010 may be touched and selected.

Then, the controller 180 may control the rear display region 300 to display the gallery application execution screen instead of the camera application execution screen, as shown in (8-2) of FIG. 8. At this time, the gallery application icon 3010 and the camera application icon 3030 may be continuously displayed.

When the camera application icon 3030 is touched and selected, the controller 180 may control the rear display region 3000 to display the camera application execution screen instead of the gallery application execution screen, as shown in (8-1) of FIG. 8.

That is, as the user selects any one of the gallery application icon 3010 and the camera application icon 3030, the user can easily select which one of two or more applications that are being multitasked will be displayed on the rear display region 3000.

Although not shown, the icon corresponding to the execution screen being displayed on the rear display region 3000 from among the gallery application icon 3010 and the camera application icon 3030 may be displayed to be visually distinguished from the remaining icons. Alternatively, the icon corresponding to the execution screen being displayed on the rear display region 3000 from among the gallery application icon 3010 and the camera application icon 3030 may not be displayed.

On the other hand, the front display region when the display mode is switched to the contracted display mode will be described with reference to FIG. 9.

As shown in (9-1) of FIG. 9, the controller 180 may continuously display the camera application execution screen on the front display region 2000A. That is, the controller 180 may not display the gallery application execution screen on the front display region 2000A. In other words, the layout can be changed in a manner that the gallery application execution screen displayed on the second display region 2000B from among the camera application execution screen and the gallery application execution screen is no longer displayed on the second display region 2000B.

The controller 180 may display the gallery application icon 2010 and the multitasking icon 2030 together with the camera application execution screen. The multitasking icon 2030 represents applications of the execution screens that were simultaneously displayed on the front display region just before switching to the contracted display mode. The function of the multitasking icon will be described later.

When the gallery application icon 2010 is touched and selected, the controller 180 may control the front display region 2000A to display the gallery application execution screen instead of the camera application execution screen, as shown in (9-2) of FIG. 9. In addition, the controller 180 may display the camera application icon 2050 together with the gallery application execution screen instead of the gallery application icon 2010. The multitasking icon 2030 may be continuously displayed.

If the camera application icon 2050 is touched and selected, the controller 180 may control the front display region 2000A to display the camera application execution screen instead of the gallery application execution screen, as shown in (9-1) of FIG. 9.

On the other hand, as shown in (9-1) and (9-2) of FIG. 9, when the gallery application icon 2010 and the multitasking icon 2030 are displayed or the camera application icon 2050 and the multitasking icon 2030 are displayed, the closing icon 2040 can also be simultaneously displayed.

If the closing icon 2040 is touched and selected, the controller 180 may control at least one of the gallery application icon 2010, the multitasking icon 2030, and the camera application icon 2050 not to be displayed.

The multitasking icon 2030 will be described with reference to FIG. 10.

As shown in (10-1) of FIG. 10, the controller 180 may control the camera application execution screen to be continuously displayed on the front display region 2000A. This is as described above with respect to FIG. 9 (9-1).

The multitasking icon 2030 can be touched and selected.

Then, as shown in (10-2) of FIG. 10, the controller 180 may control the mobile terminal 100 to switch from the contracted display mode to the extended display mode. That is, the controller 180 may operate the driving unit 200 to control the mobile terminal 100 to switch to the extended display mode. The controller 180 may control the execution screens of the two or more applications being multitasked in the mobile terminal 100 to be displayed on the front display region 2000 according to the extended display mode.

Preferably, the execution screens of the two or more applications may be displayed according to the original layout before change of the display mode. That is, as shown in (10-2) of FIG. 10, the camera application execution screen is displayed on the first display region 2000A, and the gallery application execution screen is displayed on the second display region 2000B, so that the camera application execution screen and the gallery application execution screen can be simultaneously displayed as a horizontal layout on the front display region 2000.

As described above, in a situation where two or more applications are being multitasked in the mobile terminal and the execution screens thereof are simultaneously displayed, when the extended display mode is switched to the contracted display mode, the layout can be changed in a manner that only a portion of the execution screens of the two or more applications displayed in the front display region according to the extended display mode is displayed on the front display region according to the contracted display mode.

Figure 11:
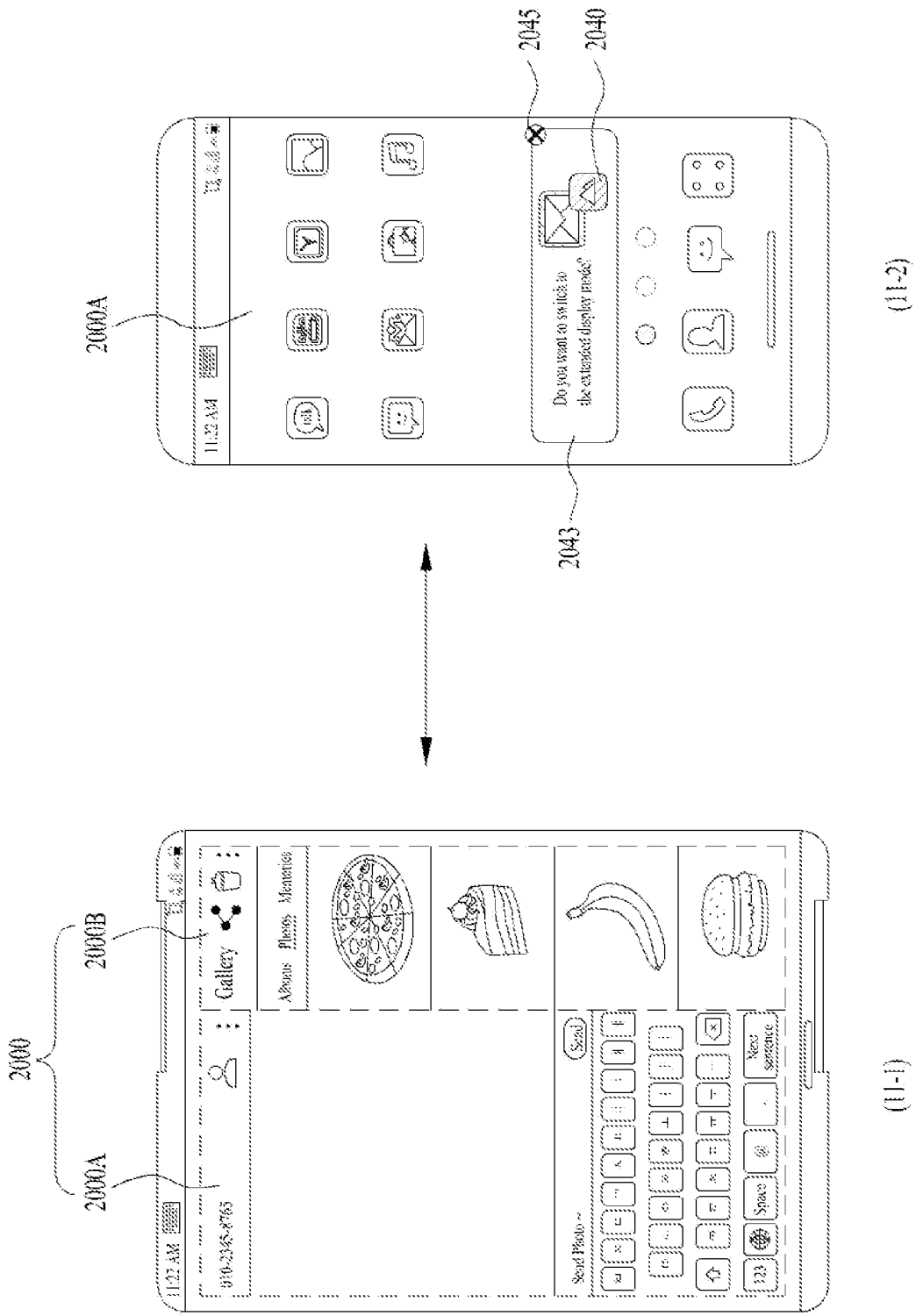
FIG. 11 illustrates a front display region for use in the extended display mode and a front display region for use in the contracted display mode according to an embodiment of the present disclosure.

However, the scope or spirit of the present disclosure is not limited thereto, and the layout can also be changed in a manner that the execution screens of the two or more applications displayed on the front display region according to the extended display mode are not displayed on the front display region according to the contracted display mode. A detailed description thereof will be given with reference to FIG. 11. FIG. 11 illustrates a front display region for use in the extended display mode and a front display region for use in the contracted display mode according to an embodiment of the present disclosure.

Two or more applications may be executed by multitasking in the mobile terminal 100 in the extended display mode. Hereinafter, it is assumed that the two or more applications include message applications and gallery applications for convenience of description.

That is, as shown in (11-1) of FIG. 11, the controller 180 displays the message application execution screen on the first display region 2000A, and displays the gallery application execution screen on the second display region 2000B, so that the message application execution screen and the gallery application execution screen can be simultaneously displayed as a horizontal layout on the front display region 2000. Of course, the message application execution screen and the gallery application execution screen can also be simultaneously displayed on the front display region 2000 in different layouts as needed.

In this case, a user command for switching from the extended display mode to the contracted display mode may be input to the mobile terminal 100 through the user input unit 123. One example of the user command input through the user input unit 123 may be a preset touch input on the flexible display, but is not limited thereto. Alternatively, the user command may indicate that the user directly switches from the extended display mode to the contracted display mode using the user's force or the user's touch.

Then, as shown in (11-2) of FIG. 11, the controller 180 controls the mobile terminal 100 to switch from the extended display mode to the contracted display mode, and then controls the mobile terminal 100 to display the home screen on the front display region 2000A according to the contracted display mode. That is, as the display mode is switched to the contraction display mode, both the message application execution screen and the gallery application execution screen may not be displayed.

Although the above-described example has disclosed that the home screen is immediately displayed on the front display region 2000A as soon as the mobile terminal 100 switches from the extended display mode to the contracted display mode, the scope or spirit of the present disclosure is not limited thereto. When an additional user command is input to the mobile terminal 100 through the user input unit 123 after the mobile terminal 100 switches from the extended display mode to the contracted display mode, both the message application execution screen and the gallery application execution screen are not displayed and at the same time the home screen can be displayed.

The multitasking icon 2040 may be displayed on the home screen. The multitasking icon 2040 represents applications of the execution screens that were simultaneously displayed on the front display region just before the mobile terminal 100 switches to the contracted display mode.

The multitasking icon 2040 may also be displayed together with both a guide graphic 2043 for explaining the function of the multitasking icon 2040 and a closing icon 2045 for closing the multitasking icon 2040 and the guide graphic 2040.

The multitasking icon 2040 may be touched and selected.

Then, as shown in (11-1) of FIG. 11, the controller 180 may control the mobile terminal 100 to return from the contracted display mode to the extended display mode. That is, the controller 180 may operate the driving unit 200 to control the mobile terminal 100 to switch to the extended display mode. In addition, the controller 180 may control the execution screens of the two or more applications being multitasked in the mobile terminal 100 to be displayed on the front display region 2000 according to the extended display mode.

Preferably, the execution screens of the two or more applications may be displayed according to the original layout before change of the display mode. That is, as shown in (11-1) of FIG. 11, the message application execution screen may be displayed in the first display region 2000A, and the gallery application execution screen may be displayed in the second display region 2000B, so that the message application execution screen and the gallery application execution screen can be simultaneously displayed in the front display region 2000 in a horizontal layout.

In accordance with the above-described example, when a user command for switching from the extended display mode to the contracted display mode is input to the mobile terminal through the user input unit 123, the mobile terminal 100 switches from the extended display mode to the contracted display mode and at the same time the home screen is displayed, but the scope or spirit of the present disclosure is not limited thereto.

For example, when a user command (e.g., a preset touch input on the flexible display) for displaying the home screen is input to the mobile terminal 100 through the user input unit 123 during the extended display mode, the mobile terminal 100 may automatically switch from the extended display mode to the contracted display mode and at the same time may display the home screen.

Figure 12:
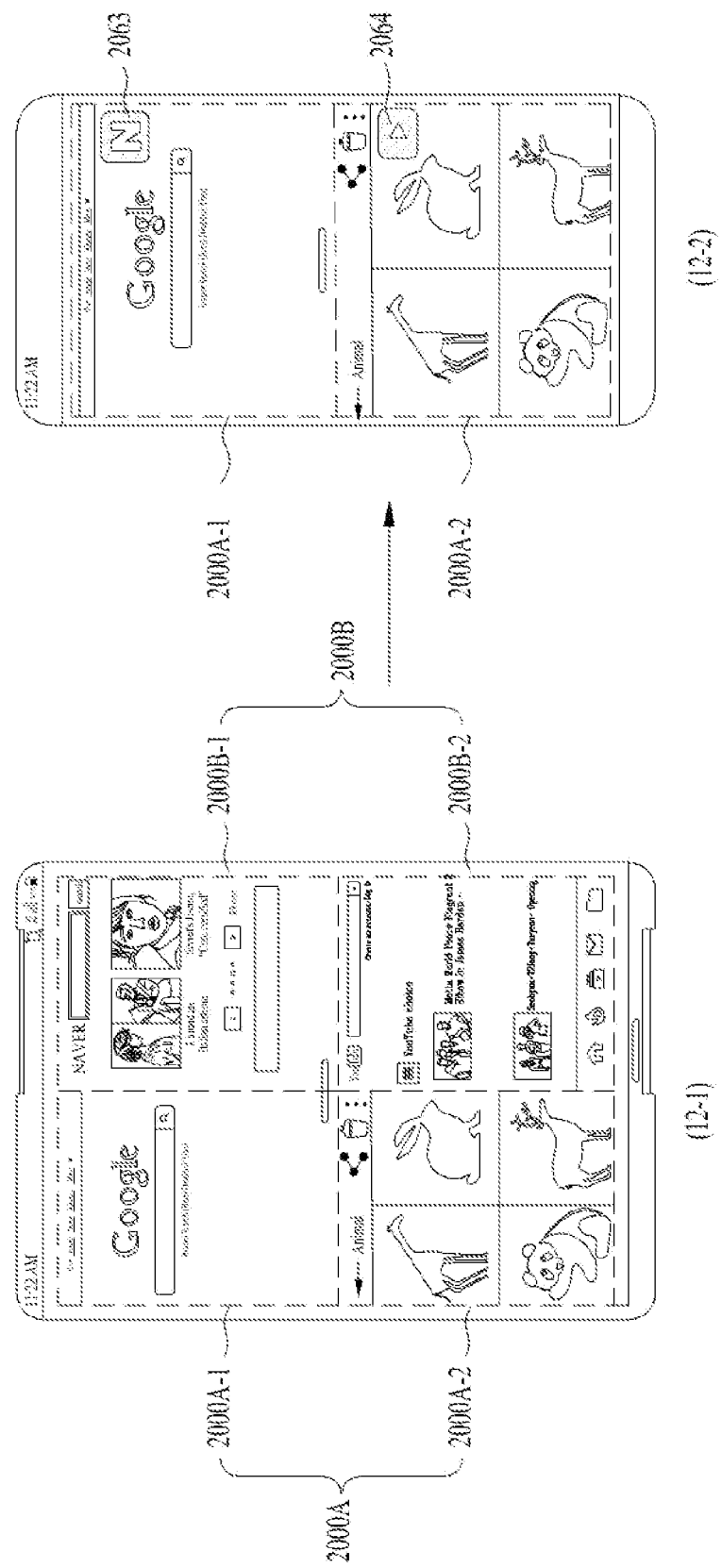
FIG. 12 illustrates a front display region for use in the extended display mode and a front display region for use in the contracted display mode according to an embodiment of the present disclosure.
Figure 13:
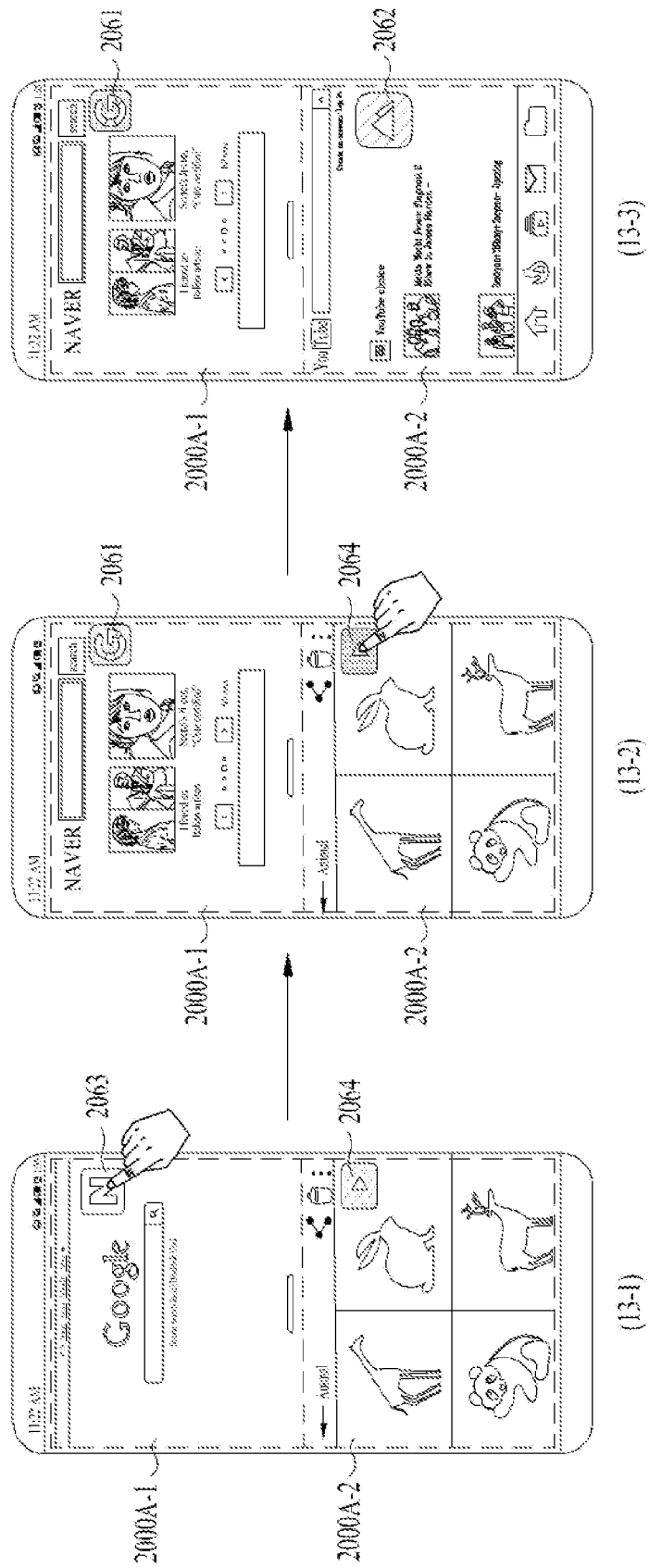
FIG. 13 is a view illustrating examples of a front display region for use in the contracted display mode according to an embodiment of the present disclosure.
Figure 14:
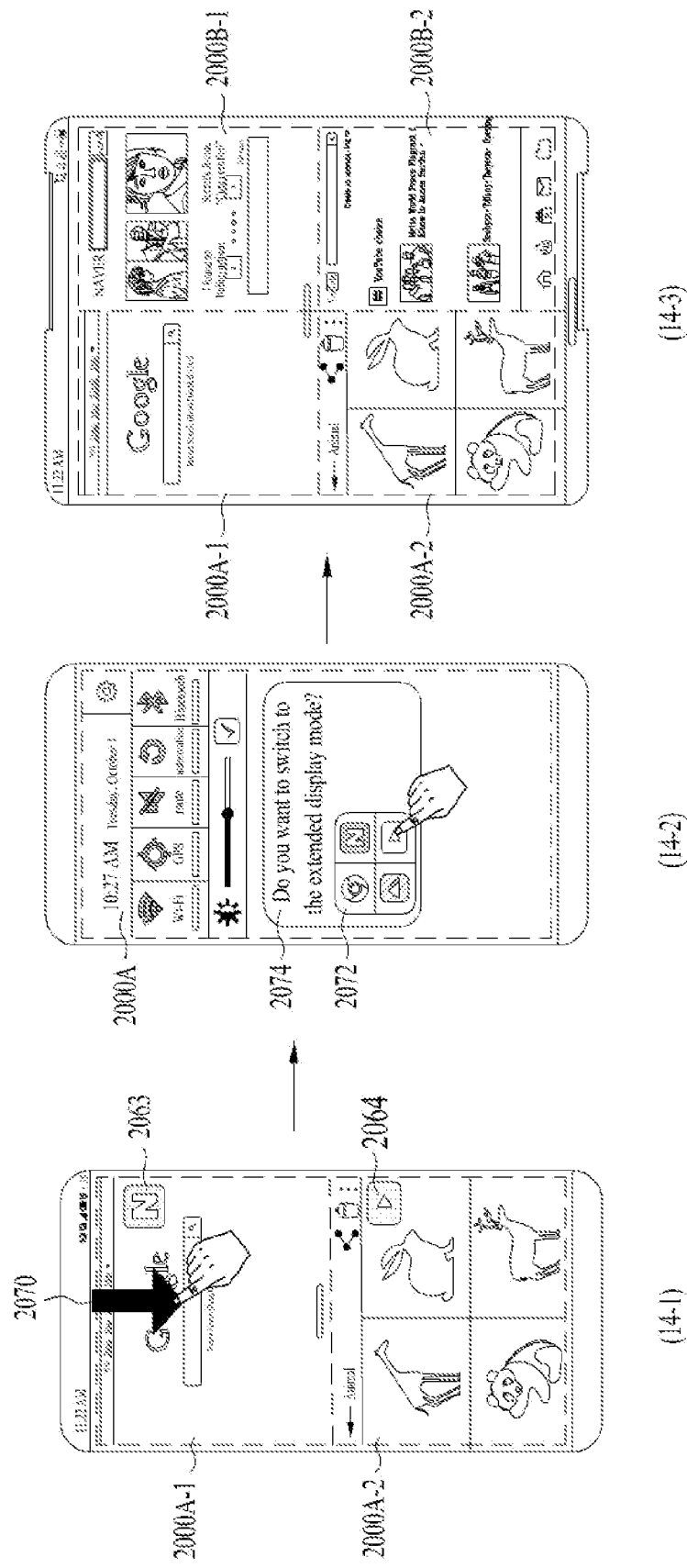
FIG. 14 illustrates a front display region for use in the contracted display mode and a front display region for use in the extended display mode according to an embodiment of the present disclosure.

Referring to FIGS. 12 to 14, various other layout changes according to switching between the extended display mode and the contracted display mode will be described. FIG. 12 illustrates a front display region for use in the extended display mode and a front display region for use in the contracted display mode according to an embodiment of the present disclosure. FIG. 13 is a view illustrating examples of a front display region for use in the contracted display mode according to an embodiment of the present disclosure. FIG. 14 illustrates a front display region for use in the contracted display mode and a front display region for use in the extended display mode according to an embodiment of the present disclosure.

At least four applications may be executed by multitasking in the extended display mode in the mobile terminal 100. It is assumed that the at least four applications include a first application, a second application, a third application, and a fourth application. Hereinafter, for purposes of explanation only, it is assumed that the first application is the Google search application, the second application is the gallery application, the third application is the Naver search application, and the fourth application is the YouTube application. Other applications (e.g., the camera application, the message application, the email application, the multimedia playback application, etc.) may correspond to at least one of the first to fourth applications.

In this case, as shown in (12-1) of FIG. 12, the controller 180 may divide the first display region 2000A into a first sub-display region 2000A-1 and a second sub-display region 2000A-2, and may divide the second display region 2000B into a third sub-display region. 2000B-1 and a fourth sub-display region 2000B-2. In addition, the controller 180 may control the first application execution screen to be displayed on the first sub-display region, may control the second application execution screen to be displayed on the second sub-display region, may control the third application execution screen to be displayed on the third sub-display region, and may control the fourth application execution screen to be displayed on the fourth sub-display screen. Here, the first sub-display region 2000A-1 and the second sub-display region 2000A-2 may correspond to the first display region 2000A described above, and the third sub-display region 2000B-1 and the fourth sub-display region 2000B-2 may correspond to the second display region 2000B described above.

That is, the first to fourth application execution screens may be simultaneously displayed as a (2×2) matrix layout on the front display region according to the extended display mode.

In this case, a user command for switching from the extended display mode to the contracted display mode may be input to the mobile terminal 100 through the user input unit 123. One example of the user command input through the user input unit 123 may be a preset touch input on the flexible display, but is not limited thereto. Alternatively, the user command may indicate that the user directly switches from the extended display mode to the contracted display mode using the user's force or the user's touch.

Then, the controller 180 controls the mobile terminal 100 to switch from the extended display mode to the contracted display mode, and then controls only some parts of the first to fourth application execution screens to be simultaneously displayed on the front display region 2000A according to the contracted display mode.

For example, as shown in (12-2) of FIG. 12, the layout can be changed in a manner that the first application execution screen and the second application execution screen can be respectively displayed in the first sub-display region 2000A-1 and the second sub-display region 2000A-2 of the front display region according to the contracted display mode. That is, the third application execution screen and the fourth application execution screen may not be displayed. In this case, although the first sub-display region 2000A-1 shown in FIG. 12 (12-1) can be identical in size to the first sub-display region 2000A-1 shown in FIG. 12 (12-2) and the second sub-display region 2000A-2 shown in FIG. 12(12-1) can be identical in size to the second sub-display region 2000A-2, the scope or spirit of the present disclosure is not limited thereto, and it should be noted that the first sub-display region 2000A-1 shown in FIG. 12 (12-1) and the first sub-display region 2000A-1 shown in FIG. 12 (12-2) may also have different sizes, and the second sub-display region 2000A-2 shown in FIG. 12(12-1) and the second sub-display region 2000A-2 may also have different sizes as needed.

Instead of displaying the third application execution screen, the controller 180 may control the third application icon 2063 to be displayed together with the first application execution screen on the first sub-display region 2000A-1 according to the contracted display mode. In addition, instead of displaying the fourth application execution screen, the controller 180 may control the fourth application icon 2064 to be displayed together with the second application execution screen on the second sub-display region 2000A-2 according to the contracted display mode.

The roles of the third application icon 2063 and the fourth application icon 2064 will be described with reference to FIG. 13.

As shown in (13-1) of FIG. 13, the third application icon 2063 being displayed on the first sub-display region 2000A-1 can be touched and selected.

Then, as shown in (13-2) of FIG. 13, the controller 180 may control the first sub-display region 2000A-1 to display the third application execution screen instead of the first application execution screen. The third application execution screen may be displayed together with the second application execution screen displayed on the second sub-display region 2000A-2. Instead of not displaying the first application execution screen, the first application icon 2061 may be displayed together with the third application execution screen on the first sub-display region 2000A-1. When the first application icon 2061 is touched and selected, the controller 180 may control the front display region according to the contracted display mode to return to the screen of FIG. 13 (13-1).

On the other hand, when the front display region according to the contracted display mode is displayed as shown in (13-2) of FIG. 13, the fourth application icon 2064 displayed in the second sub-display region 2000A-2 can be touched and selected.

Then, as shown in (13-3) of FIG. 13, the controller 180 may control the first sub-display region 2000A-2 to display the fourth application execution screen instead of the second application execution screen. The fourth application execution screen may be displayed together with the third application execution screen displayed on the first sub-display region 2000. Instead of not displaying the second application execution screen, the second application icon 2062 can be displayed together with the fourth application execution screen on the second sub-display region 2000A-2. When the fourth application icon 2064 is touched and selected, the controller 180 may control the front display region according to the contracted display mode to return to the screen of FIG. 13 (13-2).

Hereinafter, a method for allowing the mobile terminal to restore (or return) from the extended display mode to the contracted display mode will be described with reference to FIG. 14.

As shown in (14-1) of FIG. 14, when only some application execution screens are displayed on the front display region in the contracted display mode, a preset user command can be input to the mobile terminal through the user input unit 123. One example of the user command activated through the user input unit 123 may be a preset touch input (e.g., a touch dragging gesture, a swiping gesture, and a flicking gesture, etc.) that is directed downward from the upper end of the flexible display), but is not limited thereto.

Then, as shown in (14-2) of FIG. 14, the controller 180 may control a notification center window to be displayed on the front display region according to the contracted display mode. In the notification center window, an extended display icon 2072 and a guide 2074 querying the user whether to switch to the extended display mode may be displayed as one notification. The extended display icon 2074 may be configured by combining icons of the first to fourth applications that have been multitasked in the extended display mode. When a preset touch input is made on the flexible display, the extended display icon 2074 is not necessarily displayed only on the notification center window. If necessary, the extended display icon 2074 may also be displayed regardless of the notification center window.

The extended display icon 2072 may be touched and selected.

Then, the controller 180 may operate the driving unit 200 to control the mobile terminal to switch from the contracted display mode to the extended display mode, as shown in (14-3) of FIG. 14. In the front display region according to the extended display mode, the first to fourth application execution screens may be displayed as shown in (12-1) of FIG. 12.

Figure 15:
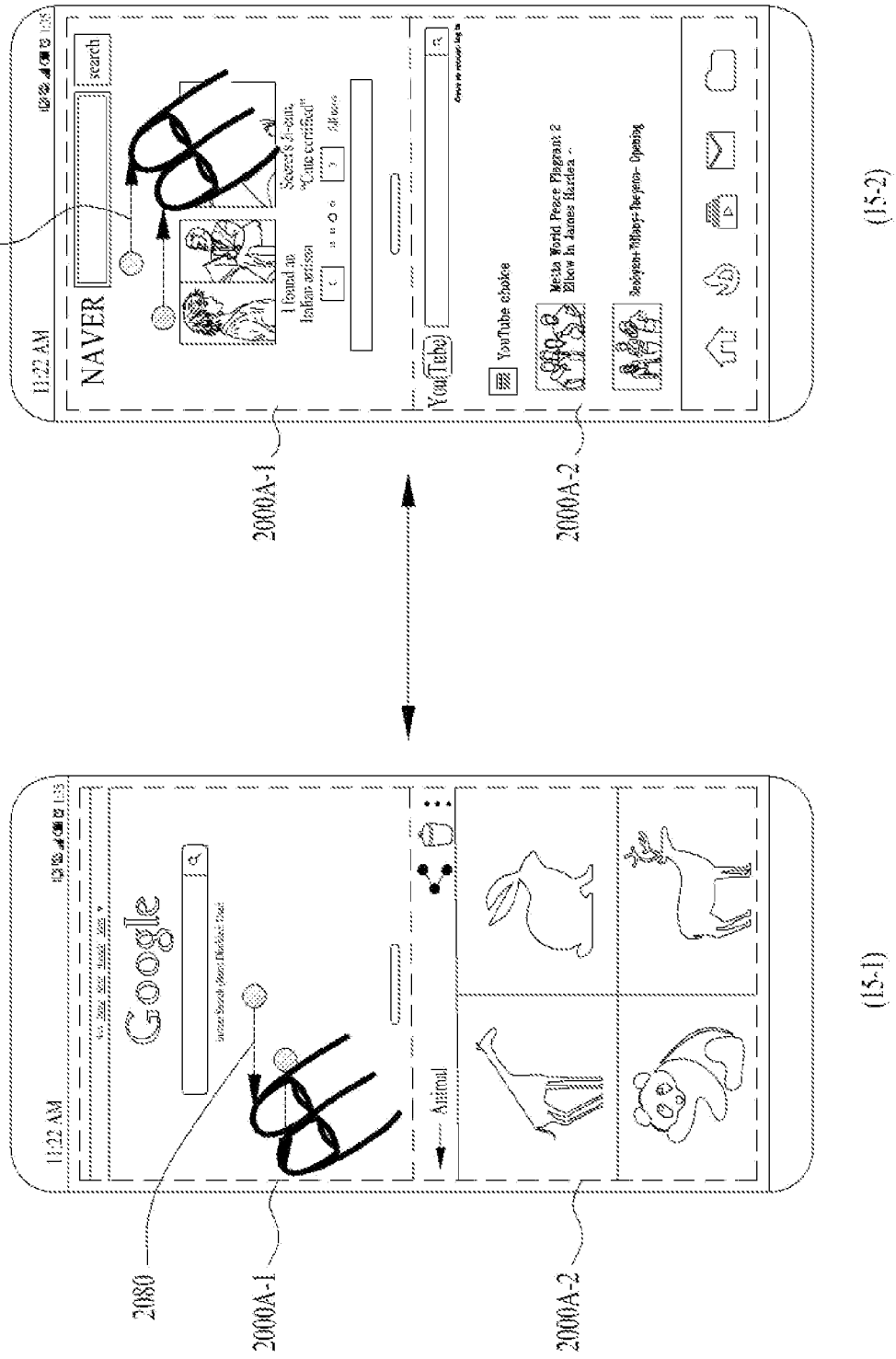
FIGS. 15 and 16 are views illustrating examples of front display regions for use in the contracted display mode according to an embodiment of the present disclosure.
Figure 16:
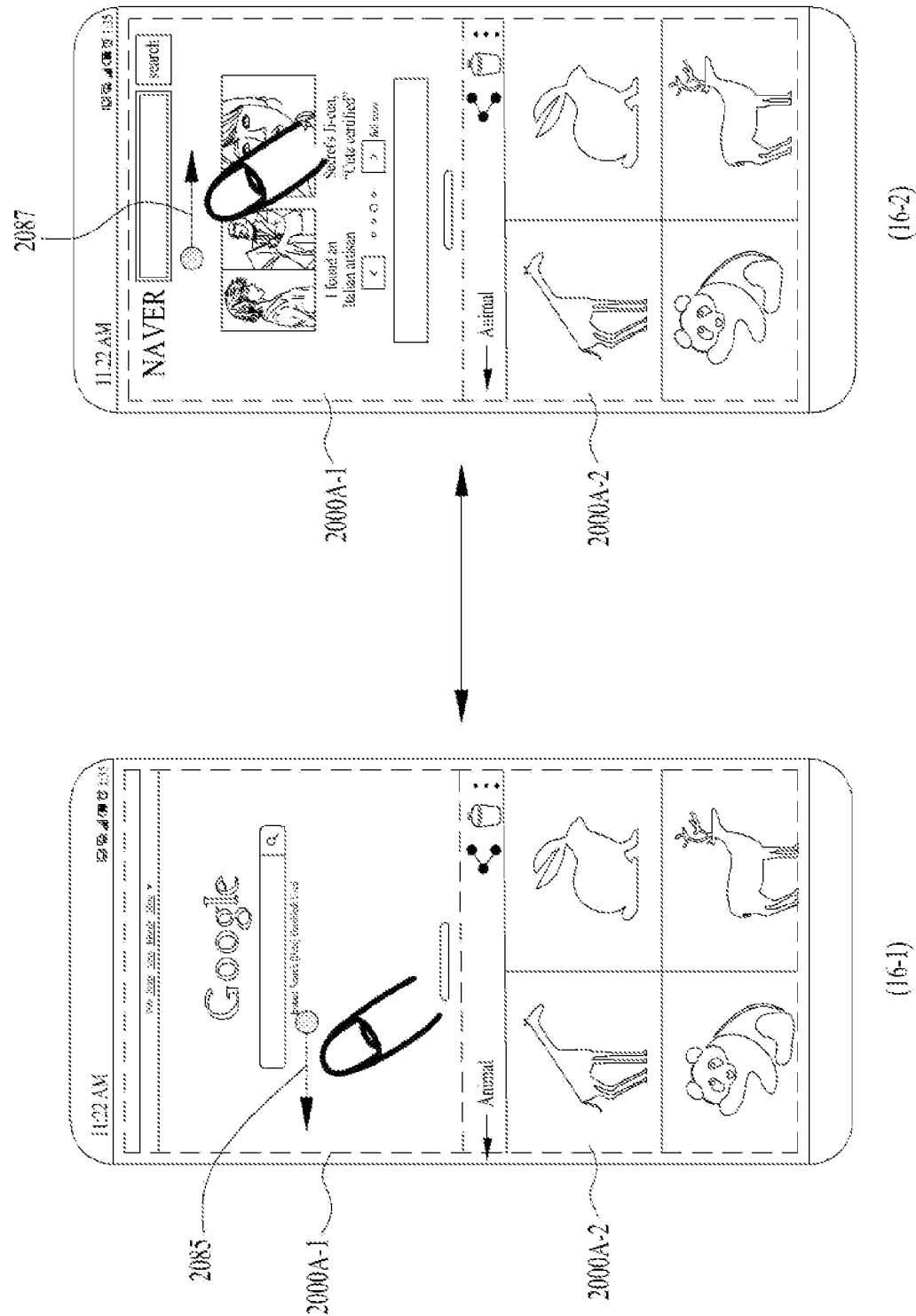

FIGS. 12 to 14 have disclosed that, in the contracted display mode, the first to fourth application icons 2061, 2062, 2063, and 2064 are displayed instead of the non-displayed application execution screens, and the non-displayed application execution screens are newly displayed through the first to fourth application icons 2061, 2062, 2063, and 2064. However, it is not necessarily to newly display the non-displayed application execution screens only through the first to fourth application icons 2061, 2062, 2063, and 2064. A detailed description thereof will be given later with reference to FIGS. 15 and 16. FIGS. 15 and 16 illustrate examples of a front display region for use in the contracted display mode according to an embodiment of the present disclosure.

As shown in (15-1) of FIG. 15, as the mobile terminal switches to the contracted display mode, the controller 180 may control the front display region to display only the first application execution screen and the second application execution screen without displaying the third application icon 2063 and the fourth application icon 2064 on the front display region. Of course, the third application icon 2063 and the fourth application icon 2064 may also be displayed as needed.

At this time, a predetermined first type of touch input 2080 may be performed in the first direction on the front display region. The predetermined first type of touch input 2080 may be a touch dragging gesture, a swiping gesture, or a flicking gesture using two fingers of the user. The first type of touch input may be performed anywhere in the first sub-display region 2000A-1 and the second sub-display region 2000A-2.

Then, as shown in (15-2) of FIG. 15, the controller 180 may control the second sub-display region 2000A-2 to display the fourth application execution screen instead of the second application execution screen, while displaying the third application execution screen instead of the first application execution screen on the first sub-display region 2000A-1.

As shown in (15-2) of FIG. 15, when the third application execution screen and the fourth application execution screen are displayed on the front display region, a predetermined first type of touch input 2082 may be performed in a second direction on the front display region. Here, the second direction may be opposite to the first direction.

Then, as shown in (15-1) of FIG. 15, the controller 180 may control the second sub-display region 2000A-2 to display the second application execution screen instead of the fourth application execution screen, while displaying the first application execution screen instead of the third application execution screen on the first sub-display region 2000A-1.

On the other hand, as shown in (16-1) of FIG. 16, when the first application execution screen is displayed on the first sub-display region 2000A-1 and the second application execution screen is displayed on the second sub-display region 2000A-2, a predetermined second type of touch input 2085 may be performed in a first direction on the first sub-display region 2000A-1. The predetermined second type of touch input may be a touch dragging gesture, a swiping gesture, or a flicking gesture using only one finger of the user.

Then, as shown in (16-2) of FIG. 16, the controller 180 may control the first sub-display region 2000A-1 to display the third application execution screen instead of the first application execution screen. The third application execution screen may be displayed together with the second application execution screen displayed on the second sub-display region 2000A-2. That is, the first application execution screen can be replaced with the third application execution screen only in the first sub-display region 2000A-1.

As shown in (16-2) of FIG. 16, when the third application execution screen and the second application execution screen are displayed on the front display region, a preset second type of touch input 2087 may be performed in a second direction on the first sub-display region 2000A-1. The second direction may be opposite to the first direction.

Then, as shown in (16-1) of FIG. 16, the controller 180 may control the first sub-display region 2000A-1 to display the first application execution screen instead of the third application execution screen. The first application execution screen may be displayed together with the second application execution screen displayed on the second sub-display region 2000A-2. That is, the third application execution screen may be replaced with the first application execution screen only in the first sub-display region 2000A-1.

On the other hand, even in the contracted display mode as shown in FIGS. 9, 10, 11, 12, 13, 15, and 16, the extended display mode shown in FIG. 0.14 may be displayed on the front display region according to a preset touch input on the flexible display. Of course, when the extended display icon is touched and selected, the mobile terminal can also be switched from the contracted display mode to the extended display mode.

Figure 17:
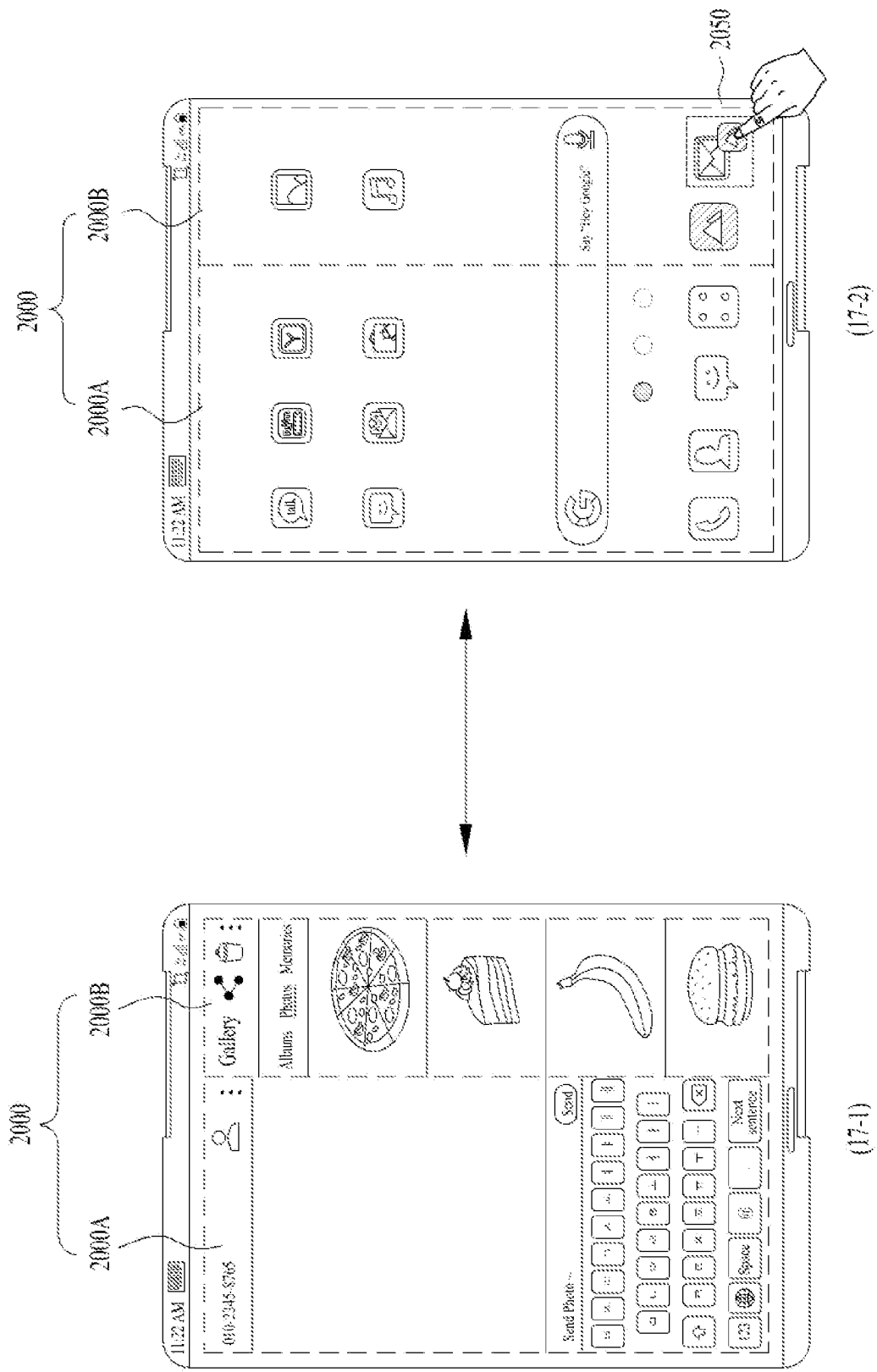
FIG. 17 is a view illustrating examples of a front display region for use in the extended display mode according to an embodiment of the present disclosure.

As described above, the above-described examples have disclosed that the layout of the two or more application execution screens is changed when the mobile terminal switches from the extended display mode to the contracted display mode. However, the embodiments of the present disclosure are not limited thereto. Even when there is no transition between the extended display mode and the contracted display mode, the layout of the two or more application execution screens can be changed. A detailed description thereof will be given with reference to FIG. 17. FIG. 17 illustrates examples of a front display region for use in the extended display mode according to an embodiment of the present disclosure.

Two or more applications can be executed by multitasking in the mobile terminal 100 used in the extended display mode. Hereinafter, it is assumed that the two or more applications include message applications and gallery applications.

That is, as shown in (17-1) of FIG. 17, the controller 180 may display the message application execution screen on the first display region 2000A, and may display the gallery application execution screen in the second display region 2000B, so that the message application execution screen and the gallery application execution screen can be simultaneously displayed as a horizontal layout on the front display region 2000. Of course, the message application execution screen and the gallery application execution screen may also be simultaneously displayed on the front display region 2000 in different layouts as needed.

At this time, a user command (e.g., a preset touch input on the flexible display) for displaying the home screen may be input to the mobile terminal through the user input unit 123.

Then, as shown in (17-2) of FIG. 17, the controller 180 may control the home screen to be displayed on the front display region 2000 according to the extended display mode. That is, both the message application execution screen and the gallery application execution screen may not be displayed.

A multitasking icon 2050 may be displayed on the home screen. The multitasking icon 2050 represents applications of the execution screens that were simultaneously displayed in the front display region 2000 just before the home screen is displayed.

The multitasking icon 2050 may be touched and selected.

Then, as shown in (17-1) of FIG. 17, the controller 180 may control execution screens of the two or more applications to be displayed according to the original layout formed before the home screen is displayed. That is, the message application execution screen may be displayed in the first display region 2000A, and the gallery application execution screen may be displayed in the second display region 2000B, so that the message application execution screen and the gallery application execution screen can be simultaneously displayed as a horizontal layout in the front display region 2000.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A mobile terminal comprising:
a body;
a display coupled to the body such that a display region visible on a front surface of the body is changeable as a display mode is switched between an extended display mode and a contracted display mode; and
a controller configured to:
in response to switching from the extended display mode to the contracted display mode, control a layout for a plurality of application execution screens simultaneously displayed on the display to be changed such that, in the contracted display mode, a first application execution screen of the plurality of application execution screens is not displayed and a second application execution screen of the plurality of application execution screen is displayed;
control a first icon and a second icon to be displayed in the contracted display mode, wherein the first icon and the second icon are for re-displaying at least one of the plurality of application execution screens;
in response to selection of the first icon, re-display the first application execution screen corresponding to the first icon, while maintaining the contracted display mode; and
in response to selection of the second icon, switch from the contracted display mode to the extended display mode, and control the first application execution screen and the second application execution screen to be displayed according to the layout formed before execution of mode switching.

2. The mobile terminal according to claim 1, wherein:
as the layout is changed, the controller controls all of the plurality of application execution screens not to be displayed.

3. The mobile terminal according to claim 2, wherein:
as the layout is changed, the controller controls a third icon for re-displaying the plurality of application execution screens to be displayed on a home screen.

4. The mobile terminal according to claim 3, wherein:
in response to selection of the third icon, the controller controls the contracted display mode to be switched to the extended display mode, and controls the plurality of application execution screens to be displayed according to the layout formed before execution of mode switching.

5. The mobile terminal according to claim 1, wherein:
the body includes
a first frame, and
a second frame extending from the first frame and coupled to the first frame so as to be contractible to the first frame;
the display includes a flexible display capable of surrounding a front surface, a side surface, and a back surface of the body; and the controller operates in the extended display mode as the second frame is extended, and operates in the contracted display mode as the second frame is contracted.

6. The mobile terminal according to claim 5, wherein:
the flexible display is coupled to the body in a manner that, since at least a display portion located at the side surface of the body moves toward the front surface of the body as the second frame is extended, a display region visible on the front surface of the body in the extended display mode increases in size.

7. The mobile terminal according to claim 6, wherein:
the flexible display is coupled to the body in a manner that, as the display portion located at the side surface of the body moves toward the front surface of the body, a display portion located at the back surface of the body moves toward the front surface of the body through the side surface of the body.

8. The mobile terminal according to claim 7, wherein:
the flexible display is coupled to the body in a manner that, as the second frame is contracted, a display portion located at the front surface of the body in the extended display mode moves toward the side surface of the body or moves toward the back surface of the body through the side surface of the body, such that a display region visible on the front surface of the body in the contracted display mode becomes smaller in size.

9. The mobile terminal according to claim 5, further comprising:
a driving unit for enabling the second frame to move either in a slidably extended manner or in a slidably contracted manner.

10. The mobile terminal according to claim 5, further comprising:
a side frame for covering the flexible display surrounding the side surface of the body.

11. The mobile terminal according to claim 5, wherein:
in the extended display mode, the plurality of application execution screens are displayed in a display region located at the front surface of the body; and
in the contracted display mode, at least one application execution screen from among the plurality of application execution screens disappears from a display region located at the front surface of the body according to the contracted display mode.

* * * * *